M. B. WEVER.
Wheels for Vehicles.
No. 153,644.  Patented July 28, 1874.
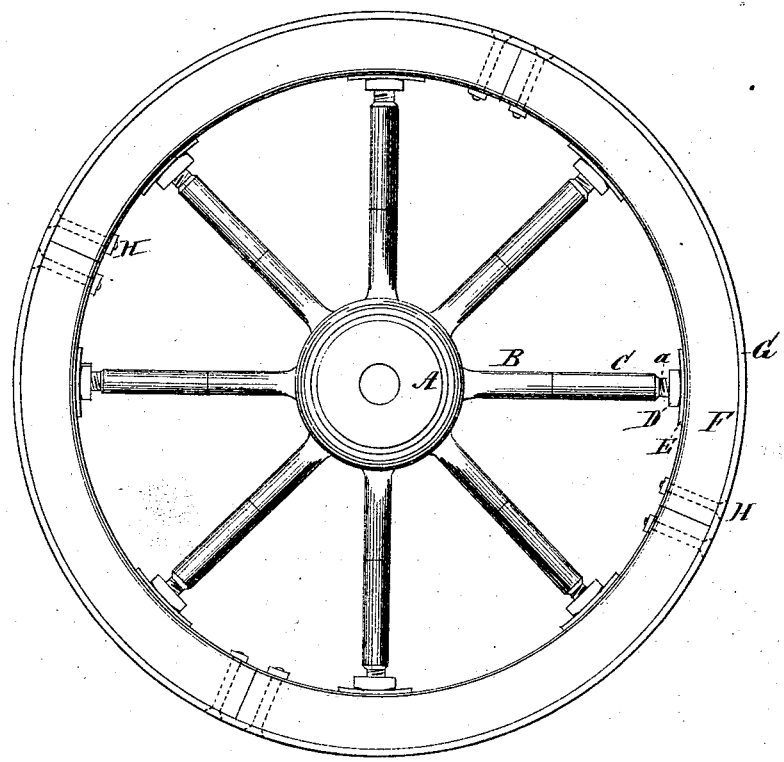
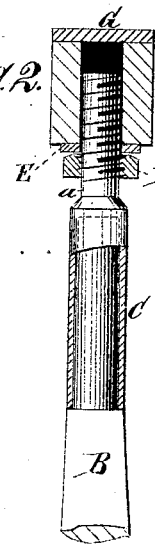
WITNESSES:
G. Mathys
Solon C. Kemon
INVENTOR:
Milledge B. Wever
BY
ATTORNEYS.

UNITED STATES PATENT OFFICE.

MILLEDGE B. WEVER, OF JOHNSTON'S DEPOT, SOUTH CAROLINA.

IMPROVEMENT IN WHEELS FOR VEHICLES.

Specification forming part of Letters Patent No. 153,644, dated July 28, 1874; application filed April 29, 1874.

*To all whom it may concern:*

Be it known that I, MILLEDGE B. WEVER, of Johnston's Depot, in the county of Edgefield and State of South Carolina, have invented a new and Improved Wheel for Vehicles; and I do hereby declare that the following is a full, clear, and exact description of the same, reference being had to the accompanying drawing forming a part of this specification, in which—

Figure 1 is a plan view; Fig. 2, a sectional view of spoke connection with felly.

This invention relates to that class of wheels for vehicles in which the spokes are adjusted to the fellies by means of a thimble terminating in a screw-threaded stem, upon which there is a nut, by turning which the spoke is tightened between the hub and felly. It consists in a new and improved arrangement, by means of which the strength and durability of the wheel are increased, the tire put on or off without heating, and the bad effects arising from the expansion and contraction of the wood-work by heat and cold avoided, thus rendering this improved wheel especially desirable for gun-carriages, army-wagons, &c.

In the drawing, A represents the hub; B, the oval-shaped spokes; C, the thimble; a, the screw-threaded stem; D, the nut; E, the washer; F, the felly; G, the tire, and H the tire-bolts.

The spokes B fit into, and rest at their outer ends upon, the bottom of the thimble C, said thimbles being four or five inches in length, according to size of wheel, oval-shaped, to prevent them from turning on the spoke with the nut, and comparatively thin at their edges when the spokes enter, to give greater strength to the spokes.

The washers E serve to prevent the wearing away of the felly by the nut D, which would otherwise rub against it. If the felly gets too tight, all that is necessary is to screw up the nuts toward the hub; if too loose, screwing them in the opposite direction will remedy the defect.

If it is required to take off the tire, unscrew the tire-bolts H that hold the tire to the felly, and screw up the nut D, and the tire will fall; to put it on, simply hold it in place and screw the nuts in the opposite direction.

Having thus described my invention, what I claim as new is—

The combination of the screw-threaded stem a, nut D, and washer-plate E, with a thimble made oval-shaped, to prevent it from turning on the spoke, all as set forth.

MILLEDGE B. WEVER.

Witnesses:
JOHN KENNEDY,
A. B. WATSON.